(12) United States Patent
Burk

(10) Patent No.: US 10,240,825 B2
(45) Date of Patent: Mar. 26, 2019

(54) EVAPORATOR SET, PREFERABLY FOR A THERMALLY DRIVEN ADSORPTION DEVICE, AND ADSORPTION DEVICE

(71) Applicant: MAHLE International GmbH, Stuttgart (DE)

(72) Inventor: Roland Burk, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 385 days.

(21) Appl. No.: 14/539,036

(22) Filed: Nov. 12, 2014

(65) Prior Publication Data

US 2015/0128630 A1     May 14, 2015

(30) Foreign Application Priority Data

Nov. 13, 2013 (DE) .................. 10 2013 223 099

(51) Int. Cl.
*F25B 39/02*      (2006.01)

(52) U.S. Cl.
CPC ........ *F25B 39/026* (2013.01); *F25B 2400/21* (2013.01)

(58) Field of Classification Search
CPC ............... F25B 2400/21; F25B 39/026; F25B 2600/2513; F25B 2338/02; F25B 2339/02
See application file for complete search history.

(56) References Cited

U.S. PATENT DOCUMENTS

| | | | | |
|---|---|---|---|---|
| 4,172,493 A | * | 10/1979 | Jacobs ............... | B60H 1/00014 165/42 |
| 4,336,159 A | * | 6/1982 | Winter .................. | C01B 31/087 502/34 |
| 4,754,805 A | * | 7/1988 | Rothmeyer ........... | F25B 17/083 165/104.12 |
| 4,979,372 A | * | 12/1990 | Tanaka .................. | F25B 41/062 236/92 B |
| 5,024,064 A | * | 6/1991 | Yonezawa ............. | F25B 17/083 62/106 |
| 5,113,668 A | * | 5/1992 | Wachs, III .............. | F25B 40/02 62/280 |

(Continued)

FOREIGN PATENT DOCUMENTS

| | | |
|---|---|---|
| CA | 2 160 659 | 7/2006 |
| CN | 1179823 A | 4/1998 |

(Continued)

OTHER PUBLICATIONS

Chinese First Office Action dated Oct. 24, 2017.

*Primary Examiner* — Kun Kai Ma
(74) *Attorney, Agent, or Firm* — Muncy, Geissler, Olds & Lowe, P.C.

(57) ABSTRACT

An evaporator set, preferably for a thermally driven adsorption device. In an evaporator set that can be connected an easily output-scalable modular thermally driven condenser set and, as a result, can be used simultaneously as a heat or cold store, a liquid collector is connected via a blockable expansion valve with an evaporator for cooling a fluid, wherein the liquid collector, the expansion valve and the evaporator form a structural unit, and wherein the liquid collector has a fluid inlet for and the evaporator a fluid outlet to a thermally driven condenser set.

9 Claims, 3 Drawing Sheets

(56) References Cited

U.S. PATENT DOCUMENTS

| | | | | |
|---|---|---|---|---|
| 5,161,389 A | * | 11/1992 | Rockenfeller | F25B 17/083 62/106 |
| 5,271,239 A | * | 12/1993 | Rockenfeller | C09K 5/047 165/80.2 |
| 5,442,931 A | * | 8/1995 | Ryan | F25B 17/08 165/104.12 |
| 5,477,706 A | * | 12/1995 | Kirol | C09K 5/047 62/480 |
| 5,546,757 A | * | 8/1996 | Whipple, III | F25B 41/062 236/92 B |
| 5,598,721 A | * | 2/1997 | Rockenfeller | C09K 5/00 62/480 |
| 5,775,126 A | * | 7/1998 | Sato | F25B 17/08 62/480 |
| 5,855,121 A | | 1/1999 | Byrd et al. | |
| 5,873,258 A | | 2/1999 | Pfister et al. | |
| 6,282,919 B1 | * | 9/2001 | Rockenfeller | B60H 1/00007 62/324.2 |
| 6,490,875 B2 | * | 12/2002 | Chua | F25B 17/083 62/144 |
| 7,823,413 B2 | | 11/2010 | Beving et al. | |
| 8,806,883 B2 | | 8/2014 | Burk et al. | |
| 2002/0189279 A1 | | 12/2002 | Pfister et al. | |
| 2005/0034473 A1 | * | 2/2005 | Casar | B60H 1/00899 62/324.1 |
| 2006/0213219 A1 | * | 9/2006 | Beving | F25B 1/04 62/468 |
| 2009/0211293 A1 | * | 8/2009 | Wolfe, IV | F24F 13/222 62/498 |
| 2010/0058799 A1 | * | 3/2010 | Lifson | F25B 41/043 62/498 |
| 2012/0000220 A1 | * | 1/2012 | Altay | B64D 13/06 62/101 |
| 2012/0055194 A1 | * | 3/2012 | Bornmann | F25B 17/08 62/477 |
| 2013/0036761 A1 | * | 2/2013 | Yonezawa | F25B 17/08 62/476 |
| 2013/0192281 A1 | | 8/2013 | Nam et al. | |
| 2013/0340253 A1 | | 12/2013 | Michel et al. | |
| 2014/0223955 A1 | | 8/2014 | Schiehlen et al. | |

FOREIGN PATENT DOCUMENTS

| | | |
|---|---|---|
| CN | 1878991 A | 12/2006 |
| CN | 102933921 A | 2/2012 |
| CN | 102933921 A | 2/2013 |
| DE | 10 2008 053 828 A1 | 5/2010 |
| DE | 11 2011 103 811 T5 | 8/2013 |
| EP | 0 851 994 B1 | 7/2002 |
| WO | WO 94/ 27 098 A1 | 11/1994 |
| WO | WO 98/ 41 802 A1 | 9/1998 |
| WO | WO 2007/068 481 A1 | 6/2007 |
| WO | WO 2013/011102 A2 | 1/2013 |
| WO | WO 2013/059785 A1 | 4/2013 |

* cited by examiner

EVAPORATOR SET, PREFERABLY FOR A THERMALLY DRIVEN ADSORPTION DEVICE, AND ADSORPTION DEVICE

This nonprovisional application claims priority to German Patent Application No. DE 10 2013 223 099.0, which was filed in Germany on Nov. 13, 2013, and which is herein incorporated by reference.

BACKGROUND OF THE INVENTION

Field of the Invention

The present invention relates to an evaporator set and to an adsorption device.

Description of the Background Art

An adsorption heat pump is known from WO 2007/068481 A1, which corresponds to U.S. Pat. No. 8,806,883, has several hollow elements, each with an adsorption/desorption region and a condensation/evaporation region (phase change region). Fluid transporting heat flows through the hollow elements in each of the regions, and the interconnection of the hollow elements is changed cyclically with respect to the flow of fluid by means of a valve arrangement.

WO 2013/011102 A2, which corresponds to US 20140223955, and which describes the concept of a sorption module in which a pipe bundle arranged in a common housing for transferring the adsorption and desorption heat to an adsorber structure on the one hand and condensation and evaporation heat to a phase change structure on the other hand. The housing concept comprises a support structure that absorbs the differential pressure between outer air pressure and the low pressure prevailing in the working medium space.

A disadvantage of the conventional art is that, through the integration of the condensation and evaporation structure in a common housing, a portion of the working medium condensates at cool places on the housing wall during desorption and is thus lost for the successive evaporation. This lost condensate cools the housing wall upon repeated evaporation and, during the next sub-cycle, brings about a cool surface with renewed condensation at which, in turn, undesired faulty condensation occurs. This is associated with a loss of performance and efficiency. As a result of the elaborate construction of the sorption module, it requires expensive tools for its manufacture. Another drawback is that the sorption modules are suitable exclusively for cooling a liquid heat transfer medium, and direct air cooling is impossible.

One fundamental drawback of sorption modules with an integrated condensation and evaporator structure is the impossibility of storing cold. This requires externally controllable fluid blocking between condensation and evaporation structure on the one hand and additional valve between evaporator and adsorber structure on the other hand. An integration of such a valve into appropriately modified modules with decentralized condensation and evaporation structures is extremely elaborate.

SUMMARY OF THE INVENTION

It is therefore an object of the present invention to provide an evaporator set and an adsorber device embodied with the evaporator set which enables easy scaling of output with the ability to store heat or cold and the direct removal of heat from a gaseous low-temperature heat source.

An exemplary embodiment relates to an evaporator set, preferably for a thermally driven adsorption device, in which a liquid collector is connected via a blockable expansion valve to an evaporator for cooling a fluid, wherein the liquid collector, the expansion valve and the evaporator form a structural unit, and wherein the liquid collector has a fluid inlet for and the evaporator a fluid outlet to a thermally driven condenser set. Such an evaporator set, in combination with a thermally driven condenser set, is characterized by its simple fluid interfaces and by its ability to store cold and heat, which can be called on independently of the availability of drive heat as needed and in an output-regulated manner.

Advantageously, the blockable expansion valve is embodied as a thermostatic or as an electrically controllable, preferably pulse width modulated expansion valve. In a thermostatic expansion valve, the vapor overheating of the working medium at the evaporator outlet determines the degree to which the expansion valve is opened. In an electrically controlled expansion valve, the opening of the expansion valve is scan-controlled, so that the appropriate quantity of working medium reaches the evaporator through multiple opening and closing of the expansion valve. The required quantity of working medium is determined by means of electronics and suitable sensors.

In an embodiment, a degree of opening or a pulse width ratio of the expansion valve can be controlled as a function of a signal of an overheating sensor system. As a result of this overheating sensor system, for example an overheating or droplet sensor, e.g., in the form of a heated NTC resistor, liquid is prevented from emerging from the evaporator set.

In an embodiment, the blockable expansion valve can be tied into a liquid line that connects the liquid collector to the evaporator. This results in an especially simple construction of the evaporator set.

In an embodiment, an inner heat exchanger can be arranged downstream from the evaporator, the inner heat exchanger having a fluid outlet for connecting to the thermally driven condenser set. By virtue of the inner heat exchanger, which acts as a subcooler, an increase in the performance of the evaporator set is achieved. After the evaporator, the evaporator set brings the suction vapor into a heat exchange with the liquid refrigerant in or after the liquid collector.

In another embodiment, the liquid collector and the expansion valve and the evaporator and/or the inner heat exchanger can be combined into a structurally continuous module. Such a module is simply mounted in a heating or cooling system, which reduces the cost of the manufacturing process for this heating or cooling system and minimizes the risk of leaks between the individual components.

One development of the invention relates to an adsorption device comprising a thermally driven condenser set having a sorption heat exchanger. In such an adsorption system, in which easy scalability of output with the ability to store heat or cold and direct removal of heat from a gaseous low-temperature heat source is possible, the condenser set is structurally combined with an evaporator set according to one of the features of this application for industrial property rights. The combination of condenser set and evaporator set leads to an adsorption heat pump or a refrigerating system that is characterized by its ability to store cold and heat, and adsorption heat and/or evaporation cold can be called upon independently of the availability of drive heat as needed and in an output-regulated manner.

The condenser set can be connected to a suction line of the evaporator of the evaporator set and to a condensate discharge line to the liquid collector of the evaporator set. The interface between condenser set and evaporator set is therefore the suction line and the condensate discharge line, also a liquid line, which empty into the central liquid collector. The connecting liquid lines can extend over a large distance to the optimum location of the liquid collector.

In an embodiment, the evaporator set can be arranged in physical proximity to the condenser set. This is advantageous especially if the suction line tends to have losses and shorter suction lines minimize losses in flow pressure.

In an embodiment, the evaporator set and the condenser set can each be embodied as a modular component. Such a modular construction enables a cascadable combination of several condenser sets with only one evaporator set. Through this modular structure, the manufacturing costs of an adsorption device are reduced substantially, and the output-scaling of the adsorption device is made possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
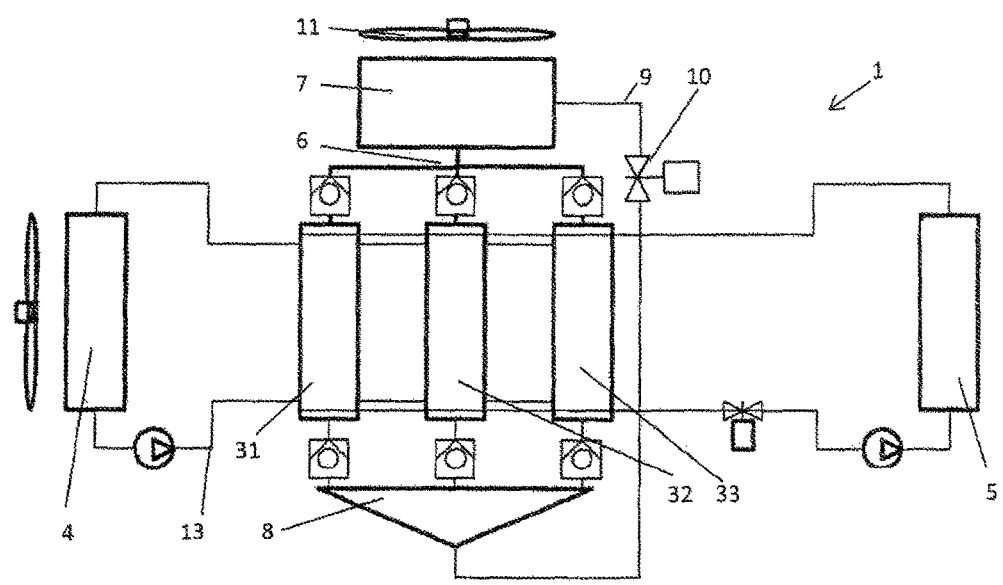
FIG. 1 shows an exemplary embodiment of an adsorber device according to the invention.

FIG. 1 shows an exemplary embodiment of an adsorption heat pump 1 which functions simultaneously as a cold and heat store. A condenser set 2 has three condenser set modules 31, 32, 33 which are arranged so as to be thermally cyclable via a fluid management system (not shown) between the temperatures of a high-temperature heat source 4 and a medium-temperature heat sink 5, it being possible to cycle the three condenser set modules 31, 32, 33 simultaneously or in a time-shifted manner as needed.

Through thermal compression and condensation, a working medium vapor is sucked at low pressure from the suction line 6 of an evaporator 7, compressed in the condenser set 2, condensed and discharged in liquid form to a liquid collector 8. The liquid collector 8 is set up such that the entire quantity of working medium can be received there. A liquid line 9 branches from this liquid collector 8 at the lowest point and leads to a blockable expansion valve 10 and, from there, to the evaporator 7. The evaporator 7 is designed to cool a liquid or, as shown in FIG. 1, to cool air that is conveyed by means of a ventilator 11 or blower through the evaporator 7.

The expansion valve 10 can be embodied as a thermostatic or as an electrically controllable, preferably pulse width modulated expansion valve 10. The components liquid collector 8, expansion valve 10 and evaporator 7 are referred to hereinafter as evaporator set 12. The expansion valve 10 can be equipped with an overheating sensor (not shown). The degree of opening or the pulse width ratio of the expansion valve 10 is controlled accordingly as a function of the signal of an overheating sensor or, alternatively, a droplet sensor and/or an output requirement signal.

Figure 2:
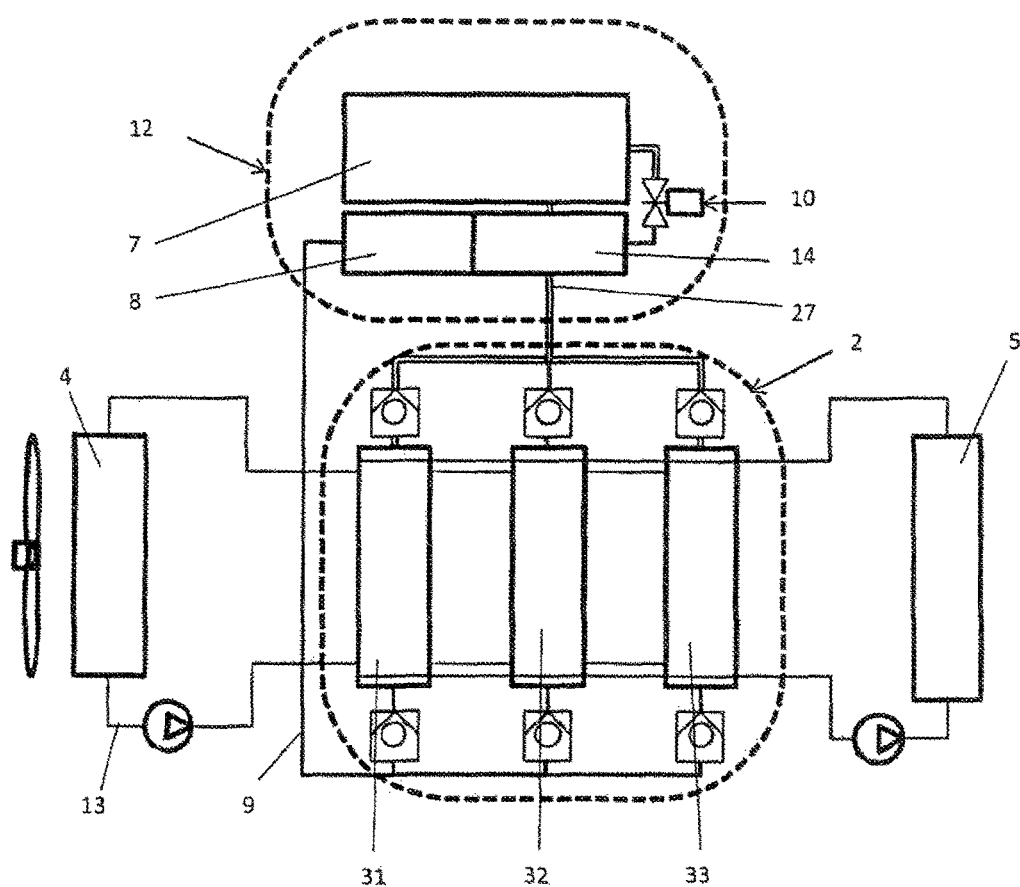
FIG. 2 shows an exemplary embodiment of an adsorber device according to the invention.

Another exemplary embodiment in the form of a structurally continuous evaporator module is shown in FIG. 2. The evaporator set 12 is connected to the thermally driven condenser set 2 only via a suction line 6 and a condensate discharge line 13, which is also embodied as a liquid line.

To increase the performance of the evaporator set 12, an inner heat exchanger 14 acting as a subcooler is provided which brings the suction vapor of the working medium after the evaporator 7 into a heat exchange with the liquid refrigerant after the liquid collector 8. The evaporator set 12 and the condenser set 2 are modular, so that they can be assembled and combined in any desired manner. The condenser set 2 need not necessarily have three condenser set modules 31, 32, 33. The number of condenser set modules 31, 32, 33 can be combined or varied in any desired manner depending on the specific application and performance design.

Since the suction line 6 with which the evaporator set 12 is connected to the condenser set 2 tends to have losses, it is proposed that the evaporator set 12 be arranged in the physical vicinity of the condenser set 2.

Figure 3:
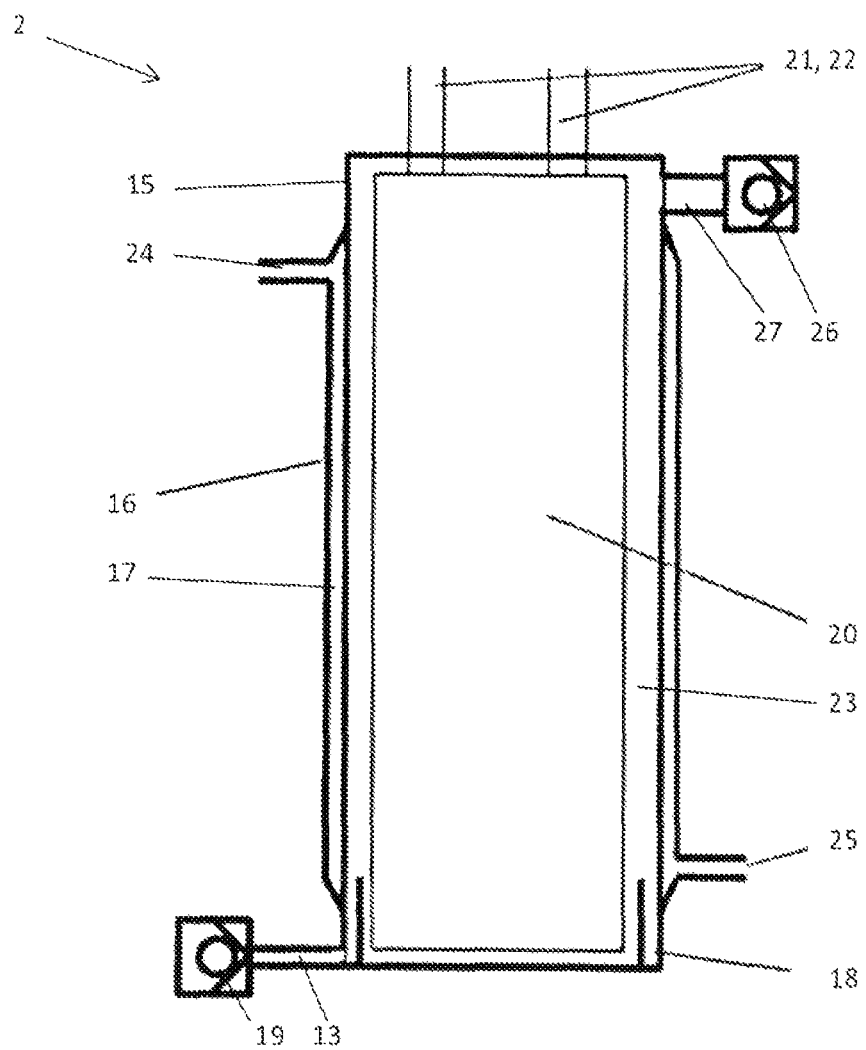
FIG. 3 shows an exemplary embodiment of an adsorber device according to the invention.

An embodiment of the thermally driven condenser set 2 can be seen in FIG. 3. The condenser set 2 has a cylindrical housing 15. The outer wall of the housing 15 is enclosed by a casing 16, with an intermediate space 17 forming between the casing 16 and the outer wall of the housing 15 through which a coolant can flow. As a result of the flowable casing space, the housing is thermally activated for the discharging of condensation heat, thus becoming a condenser. Located at the bottom end on the interior of the thermally activated housing casing is an annular channel 18 which leads outside via the condensate discharge line 13 in which a non-return valve 19 is arranged. The interior of the housing 15 is equipped with a sorption heat exchanger 20 having two fluid connections 21 and 22. This fluid conveyance system 21, 22 is in thermal contact with an adsorber structure (not shown). As a result of the at least one inlet 21 and outlet 22 of the fluid conveyance system, the sorption heat exchanger 20 can be thermally cycled by a heat exchanger of cyclically changing temperature. Through the resulting desorption and adsorption of the working medium, a change in pressure is caused within a working medium space 23 containing the sorption heat exchanger 20.

The casing 16 of the housing 15 is equipped with a second fluid conveyance system 24, 25 which absorbs condensation heat occurring during the desorption phase of the adsorber structure by being flowed through by a coolant, thus limiting the working medium pressure during the desorption phase to the condensation pressure. The condensate formed on the cooled inner surface runs down and is trapped by the upwardly open annular channel 18 and conducted to the outside via the condensate discharge line 13 with non-return valve 19. Located at any other place on the housing 15, the upper right in this case, is a suction line connection 27 also equipped with a non-return valve 26 for sucking working medium vapor from the evaporator 7.

By virtue of this design, the condenser set 2 is able to perform the following functions. As the first function, a change in pressure from evaporation pressure to condensation pressure is made possible. For this purpose, increasingly warm heat transfer medium is caused to flow through the sorption heat exchanger 20. The resulting rise in pressure closes the suction-side non-return valve 26.

The function of desorption and condensation is implemented as follows: A hot heat transfer medium continues to flow through the sorption heat exchanger 20, the working medium being desorbed at high pressure. The high pressure holds the suction-side non-return valve 26 closed. The working medium condenses on the cooled cylinder wall and runs on the inner side of the housing 15 that is thermally activated by the cooling casing 16 into the annular channel 18 arranged at the bottom, where it emerges from the working medium space 23 via the non-return valve 19 designed for the liquid phase and preferable enters the liquid collector 8.

To carry out the function of the change in pressure from condensation pressure to evaporator pressure, increasingly cooler heat transfer medium is caused to flow through the sorption heat exchanger 20. Through the resulting drop in pressure, the condensation comes to a standstill and the liquid-side non-return valve 19 closes. When the evaporator pressure is reached, the non-return valve 26, which is embodied as a suction valve, opens. In order to carry out the vapor suction and adsorption, recooled heat transfer medium is caused to continue to flow through the sorption heat exchanger 20, working medium being sucked and adsorbed at low pressure.

Together with the evaporator set 12 explained previously, the heat pump 1 equipped with this condenser set 2 not only meets the requirement of easy and cost-effective output scalability, it also enables storage of heat and/or cold. Such a system can perform different functions. For instance, an application as a thermally driven heat pump for heating purposes is conceivable. Examples of suitable high-temperature heat sources are a fuel heater, a condensing boiler or the like. The heat sink 4 represents the object to be heated, such as a building, a room or a vehicle cabin. There, the adsorption heat and the condensation heat are emitted at the medium temperature level. In the evaporator 7, low-temperature heat is absorbed from the surroundings, for example from the outside air (ventilator 11), from a ground probe, or a solar collector.

However, the system being presented can also be used as a thermally driven refrigerating system. Waste heat or excess heat from any processes or systems or heat from a fuel heater is used as the high-temperature heat. The surroundings to which the adsorption and condensation heat are discharged are used as a heat sink 4. In the evaporator 7, low-temperature heat from an object or space to be cooled is absorbed, thus cooling said object or space.

Another possible application for the system is as an adsorption cold or heat store. With a closed, externally controllable expansion valve 10, cold energy can be accumulated and stored by desorbing one or more condenser set modules 31, 32, 33 and storing the condensate formed as a result in the liquid collector 8. The capacity of the latter is such that it can receive the entire quantity of working medium from all modules of the condenser set 2. After that, at least one or more, preferably all modules 31, 32, 33 of the condenser set 2 are brought to the recooling temperature, whereby the recall of the high cold output is prepared. When cold is needed, the expansion valve 10 is opened or scanning is performed in the pulse width modulation method such that the desired evaporation performance of the evaporator 7 is released. As a result of the working medium vapor suctioned and adsorbed by the condenser set modules 31, 32, 33 of the condenser set 2, they are heated through the release of adsorption heat, which can be used, for example, to preheat an engine or the like. Upon recall of the stored heat and cold energy, the desorption of the first condenser set module 31 can begin in order to set the stationary refrigeration output.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adsorption device, comprising:
a thermally driven condenser set structurally combined with an evaporator set,
the thermally driven condenser set including multiple condenser set modules, each of the multiple condenser set modules being a condenser with a sorption heat exchanger provided therein, and
the evaporator set including an expansion valve, an evaporator, a liquid collector connected via the expansion valve to the evaporator for cooling a fluid and an inner heat exchanger connected to the liquid connector,
wherein the expansion valve, the evaporator, and the liquid collector form a modular component,
wherein the liquid collector has a fluid inlet connected to the thermally driven condenser set and the evaporator has a fluid outlet connected to the thermally driven condenser set, and
wherein the inner heat exchanger is arranged downstream from the evaporator, and wherein the inner heat exchanger has a fluid outlet for connecting to the thermally driven condenser set, such that a fluid flows from the evaporator to the inner heat exchanger and then the fluid flows from the inner heat exchanger directly to the thermally driven condenser set.

2. The adsorption device as set forth in claim 1, wherein the expansion valve is a thermostatic or an electrically controllable, pulse width modulated, expansion valve.

3. The adsorption device as set forth in claim 1, further comprising a controller, wherein a degree of opening or a pulse width ratio of the expansion valve is controlled by the controller as a function of a signal output from an overheating sensor system and/or a droplet sensor and/or a performance requirement signal, the signal being received by the controller.

4. The adsorption device as set forth in claim 1, wherein the expansion valve is tied into a liquid line that connects the liquid collector to the evaporator.

5. The adsorption device as set forth in claim 1, wherein the modular component formed by the liquid collector, the expansion valve and the evaporator further includes the inner heat exchanger.

6. The adsorption device as set forth in claim 1, wherein the thermally driven condenser set is connected to a suction line of the evaporator of the evaporator set and connected via a condensate discharge line to the liquid collector of the evaporator set.

7. The adsorption device as set forth in claim 1, wherein the evaporator set and the thermally driven condenser set are each embodied as a modular component.

8. The adsorption device as set forth in claim 1, wherein the multiple condenser set modules are connected in parallel.

9. The adsorption device as set forth in claim 1, wherein each of the multiple condenser set modules has a respective condensate line that connects to the liquid collector.

* * * * *